US008866625B2

(12) United States Patent
Schlenther et al.

(10) Patent No.: US 8,866,625 B2
(45) Date of Patent: Oct. 21, 2014

(54) SYSTEM AND METHOD FOR THE AGGREGATION AND COMMUNICATING OF PROCESS METADATA OF HETEROGENEOUS PRODUCTION PROCESS CHAINS

(75) Inventors: Christina Schlenther, Zurich (CH); Markus Spuehler, Zurich (CH)

(73) Assignee: Swiss Reinsurance Company Ltd., Zurich (CH)

(*) Notice: Subject to any disclaimer, the term of this patent is extended or adjusted under 35 U.S.C. 154(b) by 1606 days.

(21) Appl. No.: 12/123,147

(22) Filed: May 19, 2008

(65) Prior Publication Data

US 2009/0287516 A1 Nov. 19, 2009

(51) Int. Cl.
G06Q 10/06 (2012.01)
G06Q 10/10 (2012.01)

(52) U.S. Cl.
CPC .............. G06Q 10/06 (2013.01); G06Q 10/063 (2013.01); Y10S 707/99931 (2013.01); Y10S 707/99941 (2013.01); Y10S 707/99951 (2013.01)
USPC .......... 340/635; 705/7.11; 370/252; 370/386; 707/999.001; 707/999.1; 707/999.2

(58) Field of Classification Search
USPC ....... 370/252, 386; 709/200; 348/143; 705/7, 705/7.11; 707/1, 10, 999.001, 999.1, 999.2; 340/635
See application file for complete search history.

(56) References Cited

U.S. PATENT DOCUMENTS

| | | | |
|---|---|---|---|
| 6,151,601 A | 11/2000 | Papierniak et al. | |
| 6,240,416 B1* | 5/2001 | Immon et al. | 1/1 |
| 6,720,990 B1* | 4/2004 | Walker et al. | 348/143 |
| 6,990,636 B2* | 1/2006 | Beauchamp et al. | 715/764 |
| 7,053,767 B2* | 5/2006 | Petite et al. | 340/531 |
| 7,401,064 B1* | 7/2008 | Arone et al. | 1/1 |
| 2002/0082924 A1* | 6/2002 | Koether | 705/15 |
| 2003/0195934 A1 | 10/2003 | Peterson et al. | |
| 2003/0198188 A1* | 10/2003 | Castlebury et al. | 370/252 |
| 2004/0139147 A1* | 7/2004 | Duquenne et al. | 709/200 |
| 2007/0214020 A1 | 9/2007 | Srinivasan et al. | |
| 2008/0084322 A1* | 4/2008 | Erickson et al. | 340/635 |

FOREIGN PATENT DOCUMENTS

WO WO 2004/034204 A2 4/2004

* cited by examiner

Primary Examiner — Matthew Gart
Assistant Examiner — Reva R Danzig
(74) Attorney, Agent, or Firm — Oblon, Spivak, McClelland, Maier & Neustadt, L.L.P.

(57) ABSTRACT

A system and a method for aggregating and transmitting process metadata of a heterogeneous production system, the production system including a plurality of process devices to manufacture a product, the method comprising the steps of sending a user request from a communication device to a central unit, generating a metadata profile based on the user request at the central unit, accessing at least one of the plurality of the process devices of the process via an aggregation module of the central unit by using standardized control signals that were generated upon a user request, the aggregation module having access to the process devices, locating and authenticating the manufactured product in the process by the aggregation module based on authentication data; capturing process-specific data specific to the manufactured and authenticated product from the process at the aggregation module based on standardized control signals; transmitting the process-specific data from the aggregation module to the central unit, and generating the process metadata at the central unit.

20 Claims, 1 Drawing Sheet

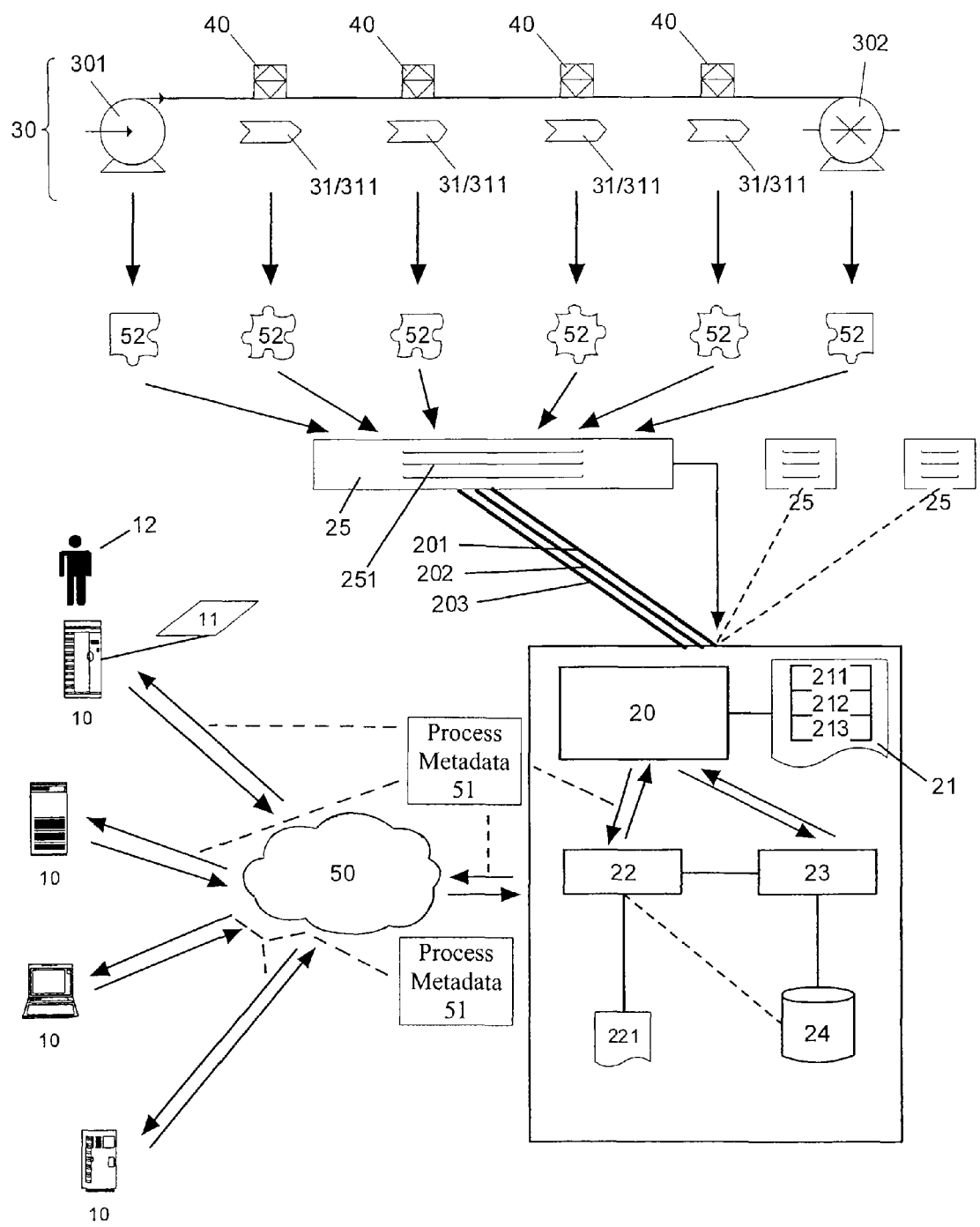

SYSTEM AND METHOD FOR THE AGGREGATION AND COMMUNICATING OF PROCESS METADATA OF HETEROGENEOUS PRODUCTION PROCESS CHAINS

This invention concerns a system and a method for aggregation and transmission of process metadata of heterogeneous production process chains, each process chain including numerous process devices which co-operate in the production process of a manufactured product. By means of the system, production-process-chain-specific operational data of a selected production process chain are captured, and standardised process metadata are generated and transmitted to a communication device of a user. In particular, the invention concerns standardised access to production process data of a wide variety of heterogeneous production process chains, with a wide variety of production devices and data capture sensors.

PRIOR ART

Throughout the world, for controlling and monitoring systems, more and more computer and communication systems are used for acquiring or transmitting operational data of processes or process chains via networks, e.g. a LAN (local area network), a WAN (wide area network) or the Internet, e.g. via the Public Switched Telephone Network (PSTN) or a mobile communication network (PLMN: Public Land Mobile Network) such as GSM (Global System for Mobile communication) or UMTS networks (Universal Mobile Telephone System) etc. In particular, operational data are shown and/or processed and/or modified and made available to other computer systems. Operational data include, among other things, digital data such as texts, graphics, pictures, animations, video, Quicktime and sound recordings. They also include MPx (MP3) or MPEGx (MPEG7) standards, as they are defined by the Moving Picture Experts Group. It is not only the monitored process chains that in most cases are heterogeneous in their composition, but also the operational data and operational data formats which are available through them. With uniform monitoring and/or analysis, the wide variety of data formats and data information contents (particularly gaps in the data) thus sets a threshold which is almost impossible to overcome. The formats and operational data contents extend from machine-specific and sensor-specific definitions to data and data formats of third parties, e.g. Nat-Cat, LAH, PCS, RLC, ACORD (Association for Cooperative Operation Research) etc. A comprehensive analysis of heterogeneous production process chains is practically impossible today, or possible only by human interaction at enormous cost in time. The problems of standardised data capture and generation across process chains are known within production, but above all in the case of access by third parties across process chains. In particular, problems are known in data capture and conversion into standardised formats. Patent specification US 2007/0214020 A1 shows a method by means of which heterogeneous operational data can be captured and stored in standardised formats by third parties. In this case, classes (or groups) are defined and used in the standard formats. The problem of automating and standardising a value chain, or value chain analysis, is also known. Patent specification US 2007/0043662 A1 shows such a method of automating the value chain. In this case, corresponding groups or classes are formed, probability distributions are assigned and corresponding formats are generated. Patent specification JP 2007011758 shows a method and system by means of which heterogeneous data can be prepared and in made available to clients in standardised form. In this case, the storage format and input format do not have to be identical. However, the system is statically configured, and must be adjusted for each case group. Patent specification UA 22174 U shows a further method and system, in which external clients can access data of a central server in a standardised manner. However, in the case of this group of documents of the prior art, above all access authorizations and security standards for access and transmission are in the foreground. Automated, standardised data capture is widely known. For this there is a wide variety of documents and approaches to solutions in the prior art. As an example of such a patent specification, WO 0215082 A1, which shows such a system, should be mentioned. In this case, standard sequences regarding safety and data transmission (data formats) for service providers in this field are also disclosed. A further such patent specification can also be found with, for instance, EP 1313043 A1. In this case, problems such as processing missing or incomplete data after capturing heterogeneous cases are discussed. Finally, we should refer to the prior art as it is known from DE 102005019434 A1, for instance. In this document too, problems and solutions in the capture of relevant data and completion of incomplete or missing data are discussed.

TECHNICAL OBJECT

It is an object of this invention to propose a new and better method which does not have the above-mentioned disadvantages of the prior art. In particular, it should be possible to aggregate and transmit process metadata of heterogeneous production process chains in standardised form, irrespective of the different process devices and corresponding standards which work together in every process chain of a manufactured product. In this way, by means of the system, it should be possible to capture production-process-chain-specific operational data of every kind from selected production process chains, and to generate corresponding process metadata automatically. The system should make automatically standardised access to production process data of a wide variety of production process chains possible, but also, in reverse, user-specific adjustment of the process metadata.

According to this invention, these aims are achieved, in particular, by the elements of the independent claims. Other advantageous embodiments emerge from the dependent claims, the description and the drawings.

In particular, these aims are achieved by the invention in that for aggregation and transmission of process metadata of heterogeneous production process chains, each process chain includes numerous process devices which co-operate in the production process of a manufactured product, production-process-chain-specific operational data of a selected production process chain being captured on a user request of a communication device and process metadata being transmitted to a communication device of a user, that by means of the aggregation modules of a central unit, which in the case of the production process chains are arranged in a decentralised way, access is made to the process devices of a selected production process chain, a metadata profile based on the user request being generated by means of the central unit at least partly dynamically for the access, said dynamically generated parts of the metadata profile including standardised control signal data for the accesses of the aggregation module to the production process chain, that by means of a first signalling channel authentication data of the metadata profile of a manufactured product are transmitted by the central unit to an aggregation module, the corresponding manufactured product being located and authenticated in the production process chain by means of the aggregation module, that by means of a second signalling channel the dynamically generated control signal data of the metadata profile are transmitted by the central unit to the aggregation module, access being made to the production process chain by means of the aggregation module on the basis of the control signal data, and production-process-chain-specific operational data of the manufactured product being captured, and that the captured operational data are transmitted by the aggregation module to the central unit, corresponding process metadata being at least partly generated by automatic analysis of the operational data by means of the central unit and transmitted to the communication device. The selected manufactured product can be specified, for instance, by the user, in the user request which is generated by means of the communication device. The dynamically determined part of the metadata profile with the control signal data can include, for instance, programs and/or program-accompanying data. The production process chain can be, for instance, a so-called value chain. In the case of manufacture of products, it can include, for instance, devices in a processing line, but also other automated devices in the added value chain. In the special case of systems which are based partly on monetary value, and where the manufactured product often corresponds to a case to be transacted, the production process chain can also include a so-called transactional chain. The operational data can include, for instance, multimedia data and/or pointers to multimedia data. The advantage of this invention is, in particular, that optimisation of the generation and transmission of operational data and/or corresponding metadata are achieved without the existing production process chains having to be adapted or extended. This has the advantage that the invention brings an improvement less expensively and faster, without the user experiencing a restriction of the quality or quantity of the transmitted information. On the other hand, it is the case that with today's production structures, in many fields such adaptation is simply impossible, because of technical or financial reasons or because of keeping business secrets. In the prior art, therefore, in most fields, on the basis of availability and accessibility, metadata can only be generated in incompletely or even wrongly standardised form. Another advantage is that in large networks, the time-consuming searching and combining of operational data, in particular in heterogeneous production process chains and heterogeneous interface and format options which are available in them, is made much easier for the user, and the user can also obtain a dynamic selection or combination which the system produces (i.e. the user obtains suggestions for actions actively from the system) and automation, which the user can influence directly, of the data capture. Another advantage of this implementation variant is that the metadata, i.e. the process metadata, continuously have the necessary up-to-datedness for the user. This is also achieved without unnecessary waste of system resources.

In an implementation variant, the manufactured products of a production process chain are automatically provided with an electronic authentication label by means of the associated aggregation module. This implementation variant has the advantage, among others, that location and authentication of a manufactured product are directly and easily possible in the production process chain on the basis of the authentication label, in particular without the user or the system first having to become active on a user request.

In another implementation variant, the dynamic part of the metadata profile for the passage of a manufactured product through the production process chain is determined automatically by means of the central unit. This implementation variant has the advantage, among others, that the user only has to give general authentication data or format instructions in the user request, without the slightest knowledge of the various heterogeneous production process chains which are being accessed.

In a further implementation variant, the central unit includes a lookup table with control signal data which are stored in standardised form, the dynamic part of the metadata profile being generated on the basis of the control signal data which are stored in the lookup table. This implementation variant has the advantage, among others, that the user can simply access or select specified control signal data or control signal commands of the metadata profile, e.g. via a suitable interface in combination with a graphical user interface (GUI) of the communication device. The user can thus simply influence the dynamic generation of the control signal data by means of the metadata profile.

In another implementation variant, from the process metadata which are associated with a manufactured product, by means of a repackaging module, taking account of the data of a user profile, the process metadata are generated and optimised in a content-oriented and user-specific manner, said content-oriented and user-specifically optimised process metadata being transmitted by the central unit to the user's communication device. This implementation variant has the advantage, among others, that starting from the standardised process metadata every desired user-specific form of the process metadata can be automatically generated and transmitted to the corresponding communication device. In particular, this is useful for implementation variants where the user can define multiple user profiles for different communication devices. A further advantage of this implementation variant is that with it the user can manage multiple quite different communication devices centrally, without having to make adjustments to the likewise heterogeneous structures of the production process chains each time. The user can thus, e.g. via a convenient interface in the central unit, determine and manage the metadata to be provided for another communication device.

In an implementation variant, the process metadata and/or pointers to process metadata are stored in a data memory of a content module of the central unit and made available to the user. The implementation variant has the advantage, among others, that metadata which are generated once and used several times do not have to be newly generated every time by the user. This allows faster access to the desired data and saves computer power. In particular, the search for operational data or generated process metadata is extended.

In another implementation variant, the user manages the data which are stored in the user's assigned data memory of the content module at least partly himself or herself. Management means, for instance, as well as direct access, deletion or modification of stored parameters. This has the advantage, among others, that the user can influence the storage of the data in the content module directly.

In a further implementation variant, by means of a third signalling channel, data of the metadata profile which are generated in standardised form and independently of the user request are transmitted by the central unit to the aggregation module, property parameters of groups of manufactured products and/or process devices being transmitted to the aggregation module on the basis of the data which are generated in standardised form.

In another implementation variant, the user profile includes user-specific data about network properties and/or data about hardware properties of the user's communication device and/ or data about user behaviour. This implementation variant has, among others, the same advantages as the preceding implementation variants; in particular, it allows network-optimised transmission of the process metadata by the central unit to the user's communication device. Similarly, for instance, the repackaging module can optimise the selected multimedia data specifically for the user, taking account of the user data, so that they are adapted to the requirements of the user's communication device and/or the communication connection from the central unit to the communication device.

In a further implementation variant, the user profile includes access condition data, which define a monetary value, which the user and/or the central unit can define, of a credit limit, up to which automatic billing of the purchased metadata takes place. This has the advantage, among others, that in the case of payment for access to content-oriented and user-specifically optimised process metadata, the user or the central unit can define freely what kind of billing should take place up to what amounts. Similarly, as an implementation variant, the central unit can capture data about user behaviour automatically and/or dynamically, and store them assigned to the user profile. This has the advantage, for instance, that statistical surveys of user behaviour can be carried out centrally, and operational data suppliers can react quickly to changed user behaviour. The user profile can also include, for instance, reuse condition data which the user and/or the central unit can define, and on the basis of said reuse condition data the central unit analyses the user profile and, for instance, makes it accessible to third parties. This implementation variant has the advantage, for instance, that the user can define to what level data about his or her user behaviour or user profile may be made accessible to third parties or used for statistical surveys. For instance, the supplier can introduce a bonus system for those users or owners of production process chains which allow more information to be reused. The service provider or operator of the central unit or of the system according to the invention can thus respond flexibly to customers' behaviour and wishes.

Below, a version of this invention is described using an example. The example is illustrated by the attached FIG. 1, which shows a schematic block diagram of the method and system, in which process metadata 52 of heterogeneous production process chains 30 are aggregated and made available or transmitted in standardised form. Each process chain 30 includes multiple process devices 31 which co-operate in the production process of a manufactured product 40.

FIG. 1 illustrates an architecture which can be used to implement the invention. In this embodiment, each heterogeneous production process chain 30 includes multiple process devices 31 which co-operate in the production process of a manufactured product 40, and sensors 311 to capture production-process-chain-specific operational data 52 of a selected production process chain 30. A production process chain 30 can be, for instance, a production line or similar of a product to be manufactured. But it can also be a so-called value chain in the production and/or processing of a product, and include all activities or production steps which are relevant to processing and/or production, e.g. by means of the process devices 31. The process metadata 51 and/or the operational data 52 of a production process chain 30 or of the participating process devices 31 and process steps can therefore be used, via the monitoring and control of the production process chain 30, as the basis for analysis of the production process chain 30 and/or optimisation of the operating parameters of the production process chain 30. In the case of automated finance-based methods, the production process chain 30 can also include, for instance, automated or semi-automated steps of a so-called transactional chain, with processing steps such as automated transmission, bonding, payment, event detection, event acceptance, monitoring event sequences and ending. The process devices 31 can include every kind of machines or devices which participate in the production process, but also, in the transferred sense, processing steps via which data can be generated. Thus the operational data 52 can include data about every kind of primary and/or supporting automated or semi-automated activities of a value chain, in particular all kinds of direct activities such as automated assembly, machine processing, transport, operational optimisation etc., indirect activities such as energy storage and supply, operation of the plant and/or process devices 31 etc. and automatic quality assurance and monitoring such as control, checking the manufactured products 40 e.g. by means of corresponding sensors or measuring devices, and other automated tests etc. The process metadata 51 can be specified, for instance, for transmission internally, between different network units, or for transmission or access via a public network such as the Internet.

By means of the system, process metadata 51 associated with the operational data 52 are generated, and transmitted by means of an interface module to a communication device 10 of a user 12. The operational data 52 can include, for instance, every kind of multimedia data and/or pointers to multimedia data. According to this invention, the reception device 10 is connected bidirectionally to a central unit 20 via a communication network 50. The communication network 50 comprises, for instance, a GSM or UMTS network, or a satellite-based mobile communication network, and/or one or more fixed networks, e.g. the public switched telephone network, the worldwide Internet or a suitable LAN (local area network) or WAN (wide area network). In particular, it also includes ISDN and XDSL connections. Operational data 52 can include, for instance, every kind of multimedia data, among other things digital data such as texts, graphics, pictures, maps, animations, moving pictures, video, Quicktime, sound recordings, programs (software), program-accompanying data and hyperlinks or pointers to other operational data 52 or multimedia data. They also include, for instance, MPx (MP3) or MPEGx (MPEG4 or 7) standards, as they are defined by the Moving Picture Experts Group. The operational data 52 can be accessible at different locations in different networks or locally for the central unit 20 by means of the aggregation modules 25, which are arranged on the production chains 30 in a decentralised manner and described below. The lost-mentioned networks can include, like the communication network 50, e.g. a LAN (local area network) or WAN (wide area network), the Internet, broadcast cable networks, PSTN, PLMN or similar. The process metadata, for instance, can be generated in a wide variety of ways, in particular using known indexing techniques, from the operational data 52 which are captured by means of the aggregation modules 25. In this embodiment, the process metadata 51 can be generated at least partly dynamically (in real time) on the basis of the metadata profile 21. This has the advantage, for instance, that the process metadata 51 always have useful up-to-dateness and exactness for the user 12. In particular, in the search for particular data or corresponding sensors 311 of process devices 31, so-called agents can be used.

The system includes aggregation modules 25 of a central unit 20, which are arranged in a decentralised manner on the production process chains 30, the process devices 31 and/or the sensors 311 of the selected production process chain 30 being accessed by means of the aggregation modules 25. For access, a metadata profile 21 is generated at least partly dynamically by means of the central unit 20, on the basis of a user request 11 of the communication device 10. The user request 11 which the user 12 generates by means of the communication device 10 can include, for instance, data for identification and/or authentication of a specified manufactured product 40. The dynamically generated parts of the metadata profile 21 include standardised control signal data 212 for accesses by the aggregation module 25 to the production process chain 30. The dynamically generated part 212 of the metadata profile 21, with the control signal data 212, can be determined, for instance, for the passage of a manufactured product 40, automatically or at least partly automatically by means of the central unit. In particular, the dynamically determined part of the metadata profiles 52 with the control signal data can include, for instance, programs and/or program-accompanying data. The central unit 20 can, for instance, include a lookup table with control signal data 212 which are stored in standardised form, the dynamic part 212 of the metadata profile 21 being generated on the basis of the control signal data stored in the lookup table. The user 12 can access or select predefined control signal data or control signal commands 212 of the metadata profile 21 in the lookup table, e.g. via a suitable interface in combination with a graphical user interface (GUI) of the communication device 10. The user 12 can thus very simply influence the dynamic generation of the control signal data 212 by means of the metadata profile 21.

By means of a first signalling channel 201, authentication data 211 of a manufactured product 40 are transmitted by the central unit 20 to the aggregation module 25. By means of the aggregation module 25, the corresponding manufactured product 40 is located and authenticated in the production process chain authentication data 211. The manufactured product 40 can include, for instance, an electronic authentication label which is automatically assigned by means of the aggregation module 25 or can be detected by means of corresponding detection devices. By means of a second signalling channel 202, the control signal data 212 of the metadata profile 21 are transmitted by the central unit 20 to the aggregation module 25. By means of the aggregation module 25, access is made dynamically, on the basis of the control signal data 212, to the production process chain and/or the sensors 311. The aggregation module 25 includes corresponding sensor interfaces 251 for access to the sensors 311.

The captured operational data 52 of the manufactured product 40 are transmitted by the aggregation module 25 to the central unit 20, the process metadata 51 being at least partly generated by means of the central unit 20 by automatic analysis of the operational data 52 and transmitted to the communication device 10. By means of a third signalling channel 203, for instance, structural data 213 which are generated in standardised form and independently of the user request 11 can be transmitted by the central unit 20 to the aggregation module 25. The structural data 213 form a part of the metadata profile 21 which cannot be determined dynamically. On the basis of the non-dynamically generated structural data 213, for instance, property parameters of groups of manufactured products 40 and/or process devices 31 can be transmitted to the aggregation module 25. The structural data 213 can include, for instance, groups or classes, assign probability distributions within the process devices 31 and/or operational data 52 and generate corresponding metadata profile models and/or structures.

As also shown in FIG. 1, as an implementation variant the process metadata 51 can be generated by means of a repackaging module 22 from the process metadata 51 which are assigned to a manufactured product 40, taking account of the data of a user profile 221, optimised in a content-oriented and user-specific manner, or generated from the generated and aggregated process metadata 51 as user-specific metadata. The content-oriented and user-specifically optimised process metadata 51 are provided by the central unit 20 by means of a corresponding memory unit and network interface, for transmission to the user's communication device 10. The process metadata 51 and/or pointers to process metadata 51 can, for instance, be stored in a data memory 24 of a content module 23 of the central unit 20 and made available to the user. The central unit 20 can, for instance, include means for at least partial management of the data which are stored in the user's 12 assigned data memory 24 of the content module 23. The user profile 221 can, for instance, include user-specific data about network properties and/or data about hardware properties of the user's 12 communication device 10 and/or data about user behaviour. Thus from user behaviour at the communication device 10 to the aggregation module 25, by means of the user profile 221, there can be a kind of feedback possibility, by means of which the user 11 can influence the extraction or generation of the process metadata 51 directly. The above-mentioned user profile 221 is produced on the basis of user information, stored in the central unit 20 and assigned to the user 12. In this implementation variant, the central unit 20, by means of the repackaging module 22, according to the user profile 221, can generate content-oriented and user-specifically optimised process metadata 52 and transmit them to the user's 12 communication device 10. The user profile 221 can, for instance, be stored and assigned permanently to a specified user 12, or redefined for each access, or loaded from a corresponding memory unit.

The user's 12 communication device 10 can be, for instance, a PC (personal computer), TV, PDA (Personal Digital Assistant), or a mobile radio unit (in particular, for instance, in combination with a broadcast receiver). The user profile 221 can include information about a user 12 such as, for instance, location of the user's communication unit 10 in the network 50, identity of the user 12, user-specific network properties, user-specific hardware properties, data about user behaviour etc. The user 12 can, for instance, before purchasing process metadata 51, define and/or modify at least parts of the metadata profile 21 and/or the user profiles 221. Of course, the user also has the possibility of transmitting process metadata 51 to the communication device 10 by direct access, i.e. without user-specific optimisation, by means of the repackaging module 22 of the central unit. The other data of the metadata profile 21 and/or of the user profile 221 can be determined automatically by the central unit 20, by authorized third parties or also by the user 12. To produce the user profile 221, the central unit 20 can include, in particular, for instance, automatic connection recognition, user identification and/or automatic recording and analysis of user behaviour (time of access, frequency of access etc.). In an implementation variant, these data about user behaviour can then in turn be modified by the user, correspondingly to the user's wishes. In one possible implementation, the user profile 221 can include a credit limit. The credit limit is a monetary value which the user 12 and/or the central unit 20 and/or authorized third parties (e.g. banks, credit card companies, multimedia data providers etc.) can define, and defines a maximum monetary value for purchasing the process metadata 21, up to which monetary value the central unit 20 can carry out automatic billing for the purchase of process metadata 51. If the credit limit is exceeded, the central unit 20 makes an enquiry to a bank regarding the creditworthiness of the user 12, for instance. The credit limit can also be useful to the user 12, by protecting him or her from unforeseen cost for the purchase of the process metadata 51. The central unit 20 handles and manages the billing and/or the access keys. The decoding and/or decryption of the access-controlled process metadata 51 is achieved, for instance, by means of an access control module of the repackaging module 22 or of the central unit 20, it being possible to use a distribution key and/or a session key according to the ETSI standard, for instance. According to the invention, the repackaging module 22 can be implemented in hardware or software. For billing for the purchased multimedia data, i.e. billing for the purchase of the data, the central unit 20 generates corresponding billing data, which include, for instance, billing vouchers (e.g. electronically signed), similarly to CDR vouchers (call data records) in the case of so-called DUR vouchers (DAB/DVB usage records). The central unit 20, for instance, transmits the billing vouchers to a clearing module of a credit card company, where they are processed further, or the central unit 20 does the billing autonomously. By means of the repackaging module 22 or central unit 20, the standardised process metadata 51 and/or the content-oriented and user-specifically optimised process metadata can also be provided with an electronic stamp, an electronic signature or an electronic watermark. The electronic signature makes it possible to assign the process metadata 51 at any later time to the user 12 who acquired them from the central unit 20. Misuse of chargeable process metadata 51 by the user can thus be prevented. As an additional service, for instance, it is also possible to offer that on demand by the user 12 selected process metadata 51 and/or the content or specific (e.g. to be specified by the user) parts of the content of the database 24 of the content module 23 are stored on a physical medium, e.g. CD-Rom or DVD, and sent to the user, e.g. by post. However, it must be pointed out that the method must not be considered as restricted in any way in its extent of protection by the examples mentioned here.

LIST OF REFERENCE SYMBOLS

10 communication device
11 user request
12 user
20 central unit
201 first signalling channel
202 second signalling channel
203 third signalling channel
21 metadata profile
211 authentication and/or authorization data
212 dynamically generated control signal data
213 non-dynamically determinable structural data
22 repackaging module
221 user profile
23 content module
24 database
25 aggregation module
251 sensor interface
30 production process chain
301 start of production process
302 end of production process
31 process devices
311 sensors
40 manufactured product
50 communication network
51 process metadata
52 operational data
53 metadata extraction module

The invention claimed is:

1. A method for aggregating and transmitting process metadata of a heterogeneous production system, comprising the steps of:

sending a user request, from a communication device to a central unit that is in communication with the heterogeneous production system;

generating, by processing circuitry, a metadata profile based on the user request at the central unit, the metadata profile including authentication data for authenticating a manufactured product in a production process, the manufactured product being manufactured by performing the production process by the heterogeneous production system, and standardized control signals for accessing a plurality of process devices that co-act to perform the production process of the heterogeneous production system, the standardized control signals being specific to the user request;

establishing, by the processing circuitry, a first signaling channel from the central unit to an aggregation module to send the authentication data to the aggregation module, the plurality of the process devices of the process accessible via the aggregation module;

locating and authenticating, by the processing circuitry, the manufactured product in the process by the aggregation module based on the authentication data;

establishing, by the processing circuitry, a second signaling channel from the central unit to the aggregation module to send the standardized control signals;

capturing, by the processing circuitry, process-specific data specific to the manufactured and authenticated product from the production process at the aggregation module based on the generated standardized control signals of the metadata profile;

transmitting, by the processing circuitry, the process-specific data from the aggregation module to the central unit, and generating the process metadata at the central unit, the process metadata being related to interrelated stages of the production process via which the manufactured product is manufactured; and transmitting, by the processing circuitry, the process metadata from the central unit to the communication device.

2. The method according to claim 1, further comprising:
generating structural data at the central unit independently from the user request and including the structural data to the metadata profile, the structural data defining property parameters of groups of manufactured products by the process;

establishing, by the processing circuitry, a third signaling channel from the central unit to the aggregation module to send the structural data; and transmitting the property parameters of the groups of manufactured products to the aggregation module based on the structural data.

3. The method according to claim 1, further comprising:
providing, by the processing circuitry, an electronic authentication label to the manufactured product of the process by using the aggregation module.

4. The method according to claim 1, wherein said user request determines and selects the manufactured product of the process by an interaction of the user with the communication device.

5. The method according to claim 1, wherein in said step of generating the metadata profile, the standardized control signals are automatically generated.

6. The method according to claim 5, wherein said step of generating the metadata profile further includes:
using a look-up table to generate the standardized control signals, the look-up table stored at the central unit and linking different manufactured products to product-specific control signal data.

7. The method according to claim 1, further comprising:
repackaging, by the processing circuitry, the process metadata that is specific to the manufactured product by a repackaging module at the central unit, by taking into an account a user profile that is stored at the central unit, before said step of transmitting the process metadata.

8. The method according to claim 1, further comprising:
generating, by the processing circuitry pointers to the generated process metadata at the central unit that are accessible by the communication device.

9. The method according to claim 1, wherein the standardized control signals included in the metadata profile are dynamically generated by the central unit circuitry.

10. The method according to claim 1, wherein the standardized control signals enable dynamic access to the plurality of process devices.

11. The method according to claim 1, wherein the manufactured product includes an electronic authentication label that is detectable by at least one of the plurality of process devices.

12. A system for aggregating and transmitting process metadata of a heterogeneous production system, comprising:
central unit circuitry for data processing and being in communication with the heterogeneous production system;
aggregation module circuitry having access to a plurality of process devices of the production system; and
communication device circuitry that is controlled by a user and in communication with the central unit circuitry, wherein
the communication device circuitry is configured to send a user request to the central unit circuitry,
the central unit circuitry is configured to generate a metadata profile based on the user request, the metadata profile including authentication data for authenticating a manufactured product in a production process, the manufactured product being manufactured by performing the production process by the heterogeneous production system, and standardized control signals for accessing the plurality of process devices that co-act to perform the production process of the heterogeneous production system, the standardized control signals being specific to the user request, to establish a first signaling channel from the central unit circuitry to the aggregation module circuitry to send the authentication data, and to establish a second signaling channel from the central unit circuitry to the aggregation module circuitry to send the standardized control signals,
the aggregation module circuitry is configured to locate and authenticate the manufactured product in the process based on the authentication data received from the central unit circuitry, to capture process-specific data specific to the manufactured and authenticated product from the production process based on the generated standardized control signals, of the metadata profile, received from the central unit circuitry, and to transmit the process-specific data from the aggregation module circuitry to the central unit circuitry, and
the central unit circuitry is further configured to generate the process metadata based on the process-specific data and to transmit the process metadata to the communication device circuitry, the process metadata being related to interrelated stages of the production process via which the manufactured product is manufactured.

13. The system according to claim 12, wherein the central unit circuitry is further configured to
generate structural data independently from the user request and including the structural data to the metadata profile, the structural data defining property parameters of groups of manufactured products by the process, establish a third signaling channel from the central unit circuitry to the aggregation module circuitry to send the structural data; and to transmit the property parameters of the groups of manufactured products to the aggregation module circuitry based on the structural data.

14. The system according to claim 12, wherein the aggregation module circuitry is further configured to provide an electronic authentication label to the manufactured product of the process.

15. The system according to claim 12, wherein the communication device circuitry is further configured to determine and select the manufactured product of the process by user interaction.

16. The system according to claim 12, wherein the central unit circuitry is further configured to generate the standardized control signals automatically.

17. The system according to claim 16, wherein the central unit circuitry is further configured to
use a look-up table to generate the standardized control signals, the look-up table stored at the central unit circuitry and linking different manufactured products to product-specific control signal data.

18. The system according to claim 12, further comprising:
repackaging module circuitry configured to package the process metadata that is specific to the manufactured product, by taking into an account a user profile that is stored at the central unit circuitry, before transmitting the process metadata to the communication device circuitry.

19. The system according to claim 12, wherein the central unit circuitry is further configured to generate pointers to the generated process metadata that are accessible by the communication device circuitry.

20. The method according to claim 9, wherein the standardized control signals are generated based on a user profile independently of the user request, and without additional user input.

* * * * *